United States Patent [19]

Willen

[11] Patent Number: 5,681,127

[45] Date of Patent: Oct. 28, 1997

[54] PRECISION ASSEMBLY BETWEEN TWO COMPONENTS

[75] Inventor: Charles Willen, Villeneuve, Switzerland

[73] Assignee: PCM Willen S.A., Villeneuve, Switzerland

[21] Appl. No.: 373,597

[22] Filed: Jan. 17, 1995

[30] Foreign Application Priority Data

Feb. 9, 1994 [EP] European Pat. Off. ............ 94810072

[51] Int. Cl.$^6$ .................................................... F16B 2/18
[52] U.S. Cl. ..................... 403/322; 403/348; 403/374; 403/409.1; 403/DIG. 8
[58] Field of Search .............................. 403/348, 349, 403/350, 373, 374, 322, 323, 324, 325, 320, 314, 353, 343, 409.1, DIG. 8

[56] References Cited

U.S. PATENT DOCUMENTS

| 1,114,497 | 10/1914 | MacDonald | 403/343 X |
| 3,254,727 | 6/1966 | Helton et al. | 403/350 X |
| 3,387,865 | 6/1968 | Ross | 403/343 X |
| 3,811,785 | 5/1974 | Hagglund | 403/374 X |
| 4,509,882 | 4/1985 | Lautenschlager, Jr. | 403/323 X |
| 4,715,753 | 12/1987 | Tack | 403/322 X |
| 5,104,141 | 4/1992 | Grove et al. | 403/409.1 X |

FOREIGN PATENT DOCUMENTS

| 570668 | 11/1993 | European Pat. Off. | 403/374 |
| 4119326 | 12/1992 | Germany | 403/349 |
| 2 187 820 A | 9/1987 | United Kingdom . | |
| WO 82/00863 | 3/1982 | WIPO . | |

*Primary Examiner*—Harry C. Kim
*Attorney, Agent, or Firm*—Kane, Dalsimer, Sullivan, Kurucz, Levy, Eisele and Richard, LLP

[57] ABSTRACT

The first component (1) has a female part, and the second (21) a male part. The female part comprises an axial bore (3) containing a tie (4), one of the ends of which is designed to constitute the female part of a bayonet-type fitting. The tie also comprises a transverse passage (5) through which there passes a spindle equipped with two journals housed in two transverse holes in the first component (1). Between the two journals and in the portion to be found inside the passage (5) of the tie (4) there is a cam (12). The male part of the second component (21) comprises one end (24) designed to constitute the male part of the bayonet-type fitting which, together with the female part (6) of the tie (4), axially fastens the two components (1, 21), and a journal (23) of diameter matching the diameter of the bore (3). The spindle is equipped to be turned in order to obtain clamping and release of the two components (1, 21) through the action of the cam (12) on the walls of the transverse passage (5).

6 Claims, 3 Drawing Sheets

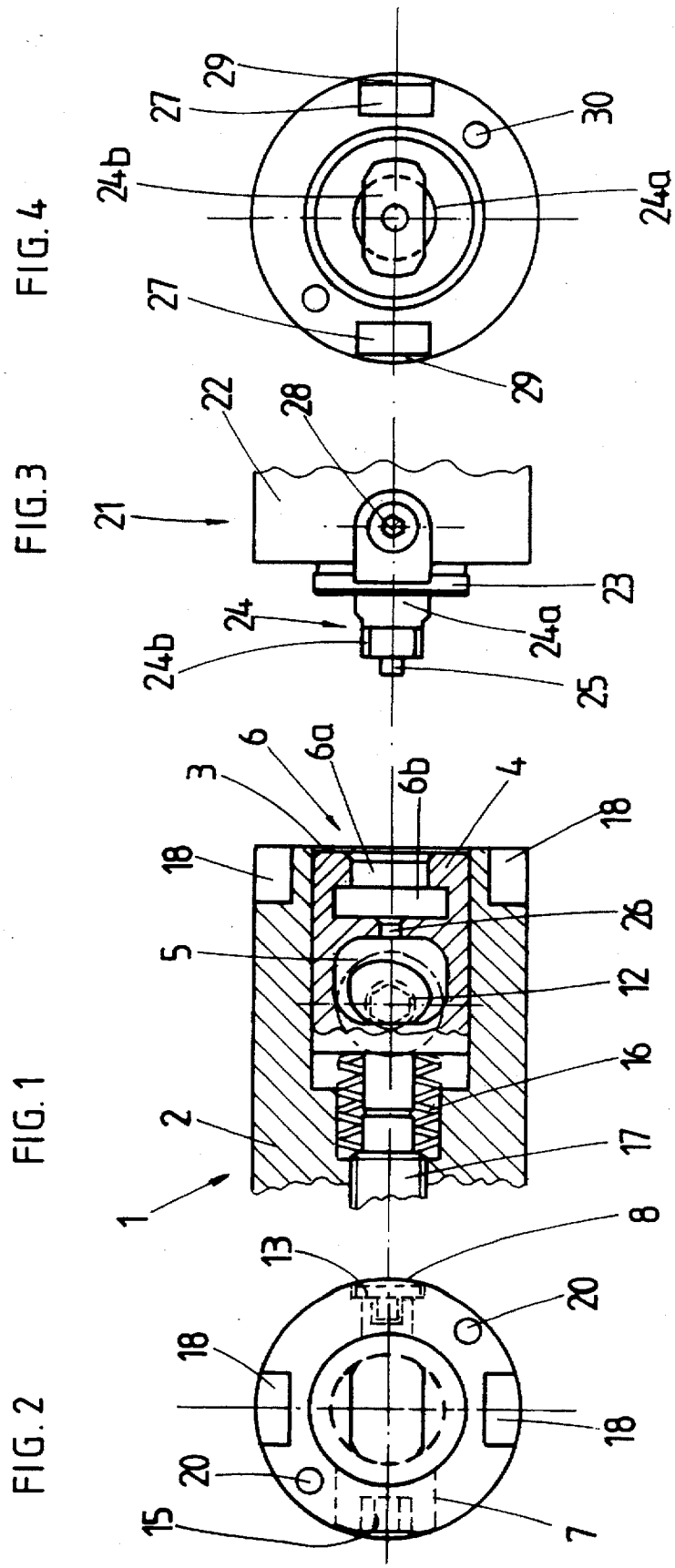

PRECISION ASSEMBLY BETWEEN TWO COMPONENTS

FIELD OF THE INVENTION

The present invention relates to a precision assembly between two components, the first of which has a female part and the second of which has a male part, with a high clamping force and speedy changeover.

The invention relates commonly to precision mechanics, nevertheless, numerous other applications are possible when it is desired to fasten an element to a support rigidly and temporarily with ease and speed during clamping and release. It is also desirable to obtain great fastening precision (centring of the components), a high clamping force with resistance to loads in all directions, speedy changeover and also a construction which can be produced for the lowest possible cost.

PRIOR ART

Fastening devices exist which allow the above mentioned requirements to be satisfied with some degree of success. Very often, these devices have weaknesses as regards one or other of the required conditions and are of a relatively high cost, due mainly to the complexity of the structure. Moreover, these constructions often cannot apply to small components, for example if reference is made to components of cylindrical overall shape, it would be desirable to be able to assemble components of a diameter of the order of 15 mm.

In order to obtain clamped assembly of two components, it is known to use an eccentric or a cam. Nevertheless, two contradictory problems arise in such cases, namely, if the eccentricity is great in order to allow relatively large axial movement between the components to be assembled, the clamping force is not very high and may detract from the quality of the assembly in precision mechanics, or conversely, if the eccentricity is small, high clamping forces are obtained but in this case the possible movement between the components to be assembled is very short and the positioning of the two components, especially the male component in the female component cannot be achieved while satisfying all the requirements which are indispensable to afford great rigidity to all types of load.

In addition, when it is desired to obtain an assembly also allowing the transmission of violent torsional loads between the two components, it is necessary to provide elements which allow these loads to be transmitted. The only way is to use male elements located about the axis of rotation and collaborating with female elements. In this case, in order to achieve an assembly which, on the one hand, axially retains the two components and, on the other hand, allows torsional loads to be transmitted, it is necessary to have a relatively substantial axial movement between the two components to be assembled. It is also very useful to be able to perform this assembly and disassembly with speed and precision, and above all, for all these functions to be achieved perfectly, even with components of a relatively small volume.

SUMMARY OF THE INVENTION

The object of the present invention is to propose such an assembly alleviating the drawbacks of the prior art.

The assembly according to the invention is one wherein the female part comprises an axial bore containing a tie, one of the ends of which is equipped with an opening designed to constitute the female part of a bayonet-type fitting and it further comprises a transverse passage through which there passes a spindle equipped with two journals housed in two transverse holes in the first component and including, between the two journals and in the portion to be found inside the passage of the tie, a cam, the transverse section of which has at least two opposed wall parts, the distance between which is less than the distance between two axially opposed walls of the transverse housing of the tie, wherein the male part of the second component comprises an end designed to constitute the male part of the bayonet-type fitting which, in collaboration with the female part of the tie, axially fastens the two components, and a journal of diameter matching the diameter of the bore, whherein said spindle is equipped with means to be turned in order to obtain clamping and release of the two components through the action of the cam on the walls of the transverse passage of the tie.

The advantages of the invention are as follows:

By using a bayonet-type fitting first of all axial fastening of the two components is obtained easily. The use of a tie which can move in the bore of the female component and of a cam acting on the walls of a transverse passage the shapes and dimensions of which allow an axial clearance between the two components to be assembled contribute to the speed of assembly and of disassembly. Indeed, when the cam and the tie are at rest, it is sufficient to engage the male part of the bayonet-type fitting in the female part, to make a rotation to ensure axial holding, this rotation preferably being through 90°, and then to act on the transverse spindle in order to move the tie in the clamping direction, that is to say to bring the female and male component into close contact.

According to a preferred embodiment, a return means, especially a spring, acts on the tie in order to push it toward the rest position, thus making it possible to obtain the maximum movement of the tie toward the outside of the bore during release of the two components, and allow the two components to be disassembled.

The axial movement between the two components is very important when the assembly also has to transmit torsional loads, and when male elements of the male part which is situated around the axis of rotation have to couple with female elements of the female part. Indeed, for such an assembly to be able to work, it is necessary that the distance between the bearing surfaces of the two components to be assembled be sufficient for the male components, allowing the transmission of torsional loads, not to be in contact with the surface of the female part during the rotation of the two components bringing about the bayonet-fitting. This is therefore obtained by virtue of the axial movement of the tie pushed forward by a spring according to one preferred embodiment variant. Thus, when the components are turned in order to achieve the bayonet-type fitting, the male elements and the female elements which provide for the transmission of torsional loads are brought to face each other at the same time and the action on the tie is against the spring in order to make the two parts approach each other and to clamp them, by actuating the transverse spindle using the cam.

According to another embodiment variant, in order to obtain quick and easy centring during assembly, despite the infinitesimally small clearance of fit, the male and female parts are preguided during the bayonet-fitting by means of a stub situated on the male part of the bayonet-type fitting and of a hole situated on the female part of the bayonet-type fitting on the axis of the tie. The hole in question also makes it possible to lubricate the transverse housing of the cam spindle.

For the purpose of obtaining clamping and release of the assembly by acting solely in one direction, the profile of the cam has an asymmetric structure along its lateral surface. Thus, in the rest position, a plane surface, whose distance to the axis of pivoting and to the transverse axis is smaller relative to the rest of the bearing surface of the cam, is in contact with the wall of the transverse housing situated on the opposite side to the assembly side, and it is followed by a first section which has a rapidly progressive slope making it possible, after engagement of the male part of the bayonet-type fitting in the female part, and possibly after having brought the male and female parts allowing the transmission of torsional loads into register, to make the two components approach each other rapidly, followed by a section with a slow constant variation in slope for providing a high clamping force between the components, followed by a short arc of a circle concentric with the axis of pivoting and a section with a rapidly varying degressive slope ending in a flat allowing the assembly to be kept open at rest. The last, rapidly varying, section and the section in the shape of an arc of a circle make it possible to prevent the assembly from being clamped up in the wrong direction. It is in fact desirable for clamping to take place always while turning the transverse spindle in a given direction. Moreover, to this end, an arrow is drawn on the second component to indicate this direction. If, despite all this, somebody tries to clamp, by turning in the wrong direction, quite a steep ramp prevents the system from jamming.

Thus, the device according to the invention in its most complete version makes it possible to assemble quickly and precisely, and with a high clamping force, two components by virtue of a cam which has an asymmetric profile and at least two opposed parts, the distance between which is less than the distance in the axial direction between two walls of the transverse housing of the tie, thus allowing an axial movement when said parts of the cam are suitably orientated, as well as of a spring which permanently pushes the tie outward, therefore in contact with the cam.

BRIEF DESCRIPTION OF THE DRAWINGS

The invention will be described in more detail with the aid of the appended drawing.

FIG. 1 represents an axial section of the component equipped with the female part.

FIG. 2 is a side view of the preceding component.

FIG. 3 is a side view of the component equipped with the male part.

FIG. 4 is a side view of the component of FIG. 3.

DESCRIPTION OF THE PREFERRED EMBODIMENT

Referring now to FIGS. 1 to 3, we shall describe the two components to be assembled.

Figure 7:
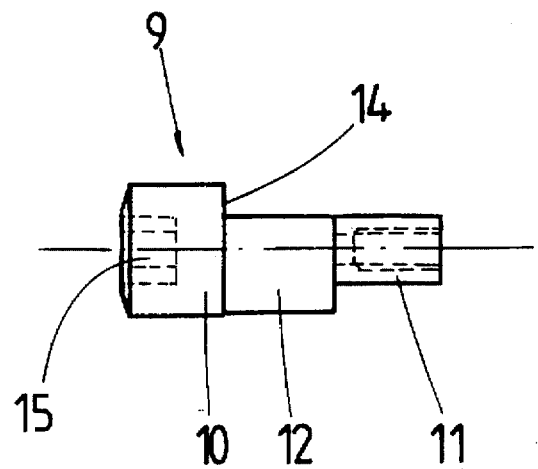
FIG. 7 is a side view of the transverse spindle which brings about clamping and release.

The component 1 equipped with a female part consists of a body 2 which may have any desired shape but through simplification and without this constituting a restriction, we have chosen a cylindrical body 2 with an outside diameter D. The body 2 is equipped with a high precision bore 3 inside which there is a tie 4 which has a transverse passage 5 having a cross section of rounded rectangular shape and, at its end via which coupling to the male component is to take place, it is equipped with a female bayonet-type fitting 6 consisting of an oblong opening 6a followed by a cylindrical hole 6b the diameter of which is at least equal to the length of the oblong hole 6a. The body 2 is equipped with two transverse passages 7 and 8 of different diameter, in which there sits a spindle 9 (FIG. 7) which has two journals 10 and 11, the dimensions of which correspond to the dimensions of the two passages 7 and 8 in the body 2. An eccentric part in the form of a cam 12 is situated inside the passage 5 of the tie 4. The spindle 9 is held axially in the body 2, on the one hand, by a retaining screw 13 and, on the other hand, by a shoulder 14. That part of the spindle which has the larger-diameter journal is also equipped with an opening 15, preferably of hexagonal shape, intended to drive the spindle by means of a male tool of matching shape and dimensions. Finally, a spring 16 is housed in an extension of lesser diameter of the bore 3 and acts on the face of the tie 4 located inside the bore in order to push it permanently toward the outside of the bore, in other words in order to push the corresponding face of the transverse passage 5 against the cam 12 of the spindle 9. A screw 17 makes it possible to adjust the force with which the spring pushes. The body 2 is also equipped with at least two notches 18 in which two corresponding male components of the male part will be housed in order to allow torsional loads to be transmitted. The body 2 also has two passages 20 passing through it, which passages will correspond, upon assembly, with two passages in the other component, allowing the passage of a fluid.

Figure 5:
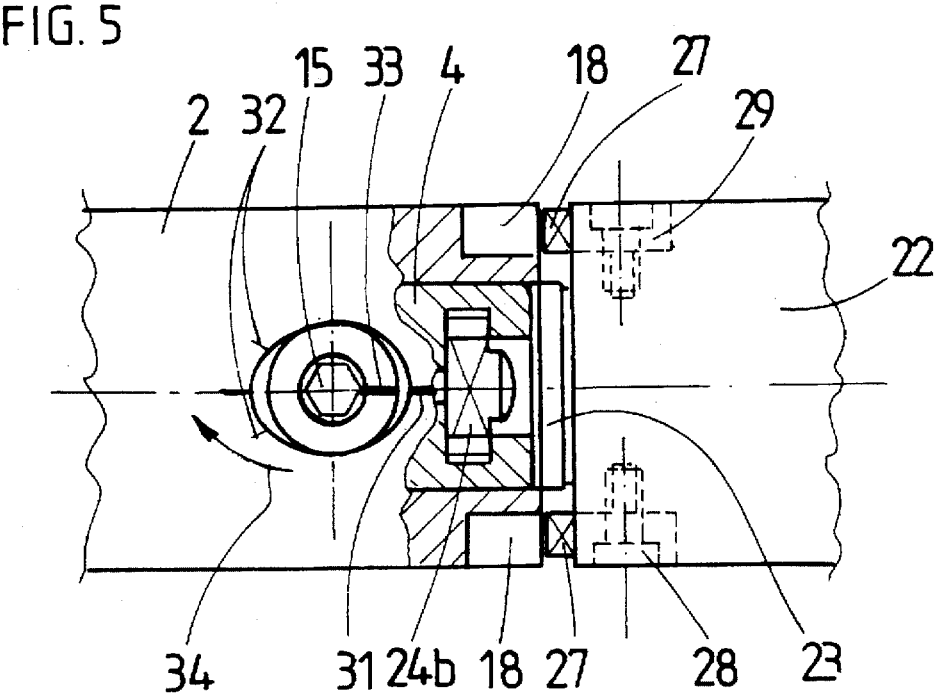
FIG. 5 is a side and partially sectioned view of the two components, partially engaged.

The other component 21 has a body 22 which also for reasons of simplicity is cylindrical here but without this constituting any restriction, and also having an outside diameter D. The body 22 is equipped with a journal 23 which has a diameter slightly smaller than the diameter of the bore 3 and is slightly chamfered to aid with centering during assembly. The journal 23 is equipped on its internal part with a male bayonet-type fitting 24 composed of a cylindrical projection 24a followed by a rounded rectangular component 24b whose dimensions correspond to the oblong hole 6a in the tie 4. For the purpose of allowing precentering when positioning the male part 24 in the female part 6 of the bayonet-type fitting, the male part is equipped on its anterior part with a centering stub 25 intended to collaborate with a hole 26 to be found beyond the bore 6b also allowing the inside of the transverse housing 5 of the tie 4 to be lubricated. The male component is also equipped with two tenons in the form of two keys 27 fastened by screws 28 into housings 29, part of which extends beyond the housing 29 in order to collaborate with the notches 18 in the female part when the two components 1 and 21 are assembled. The body 22 is also equipped with holes 30 which collaborate with the holes 20 in the body 2 for the passage of a fluid. The arrangement of the keys 27 relative to the male component 4, 24b is such that when the male and female components have been engaged and the bayonet-fitting has been fastened after a rotation preferably of 90°, said keys 29 face the notches 18 in the component 1 (FIG. 5).

Figure 6:
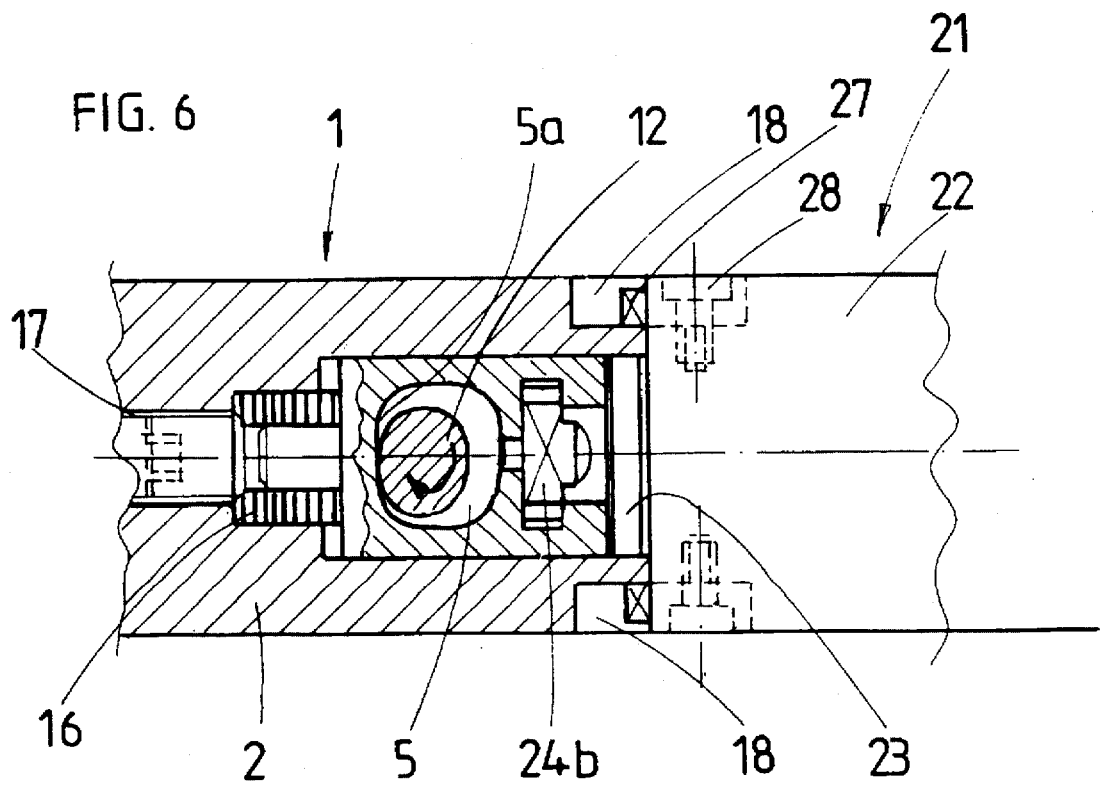
FIG. 6 is a view with axial section of the component equipped with the female part, the two components being in an assembled position.

Next, by turning the spindle 9 by means of an appropriate tool in the direction of the arrow 34, causing a reference mark 33 situated on the head of the spindle 9 to pass between the reference mark 31 and the reference mark 32, the two components 1 and 21 are clamped both axially and rotationally as represented in FIG. 6. Axial clamping is obtained by means of the cam 12 which acts on the wall 5a of the transverse housing of the tie in order to push it against the spring 16, at the same time pulling the component 21 against the component 1 by means of the bayonet-type fitting. Thus, the two components are held axially by means of the bayonet-type fitting, and the torsional loads are transmitted by means of the keys 27.

Figure 8:
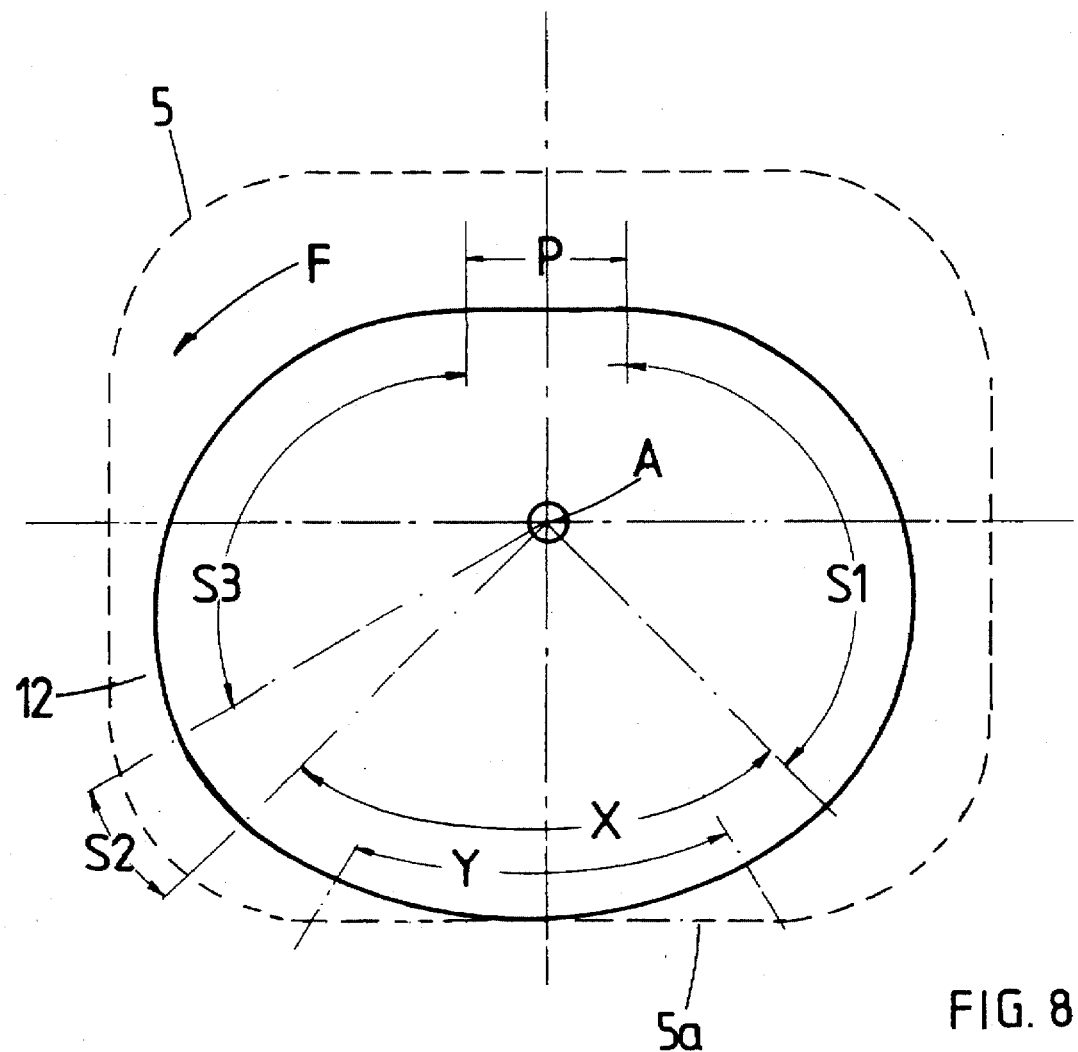
FIG. 8 is a diagrammatic and enlarged view of the profile of the cam inside the transverse housing of the tie.

An important part of this assembly is the cam 12 which we have represented in FIG. 8 viewed from beneath the spindle 9. This cam represented here inside the housing 5 has a flat P which, when it is in contact with the wall 5a of the housing 5, corresponds to the released position of the two components. The arrow F represented in this figure shows the direction in which the spindle has been turned in order to obtain clamping.

The cam as represented in FIG. 8 exhibits, in the opposite direction to the clamping direction, after the flat P, a first segment S1 which has a rapidly increasing variation in slope making it possible to make the two components 1, 21 approach each other rapidly, and especially corresponding in the case of the two components represented in the preceding figures, to the engagement of the keys 27 in the notches 18, and followed by a segment X which has a slow constantly progressing variation in slope making it possible to obtain strong and effective clamping. In actual fact, clamping must be obtained in the segment Y contained inside the segment X. Nevertheless, in order to take account of manufacturing tolerances as well as of the elasticity of the various materials, it is assumed that clamping must be obtained within the segment X. It is followed by a short segment 2 which corresponds to an arc of a circle centered on the axis of pivoting A and which acts as a reference and control part for the complete profile of the cam and it is followed by a segment 3 which has quite a steep ramp in order to prevent the clamping system from being jammed through rotation of the cam spindle in the wrong direction.

It is also important to underline that apart from the shape of this cam, the dimensions of the housing 5 play an important part in the correct operation of the assembly. Thus, it is necessary for the dimensions of the housing 5 to allow correct operation of the cam especially relative to the lateral walls and so the housing has dimensions larger than the upper dimension of the cam. The cam also has a dimension between the flat P and the segment X which is much less than the distance in the axial direction between the walls of the housing so as to give the tie 4 sufficient axial clearance in the disassembled position when the flat is in contact with the wall 5a. It should be noted that, during release, the cam 12 also makes it possible to push the tie 4 in the direction of disassembly when the force of the spring is not sufficient to free the assembly, it being possible for "binding" to occur following a very long period of assembly in an unfavorable environment.

I claim:

1. Precision assembly between two components (1,21), with a high clamping force and speedy changeover, wherein said assembly comprises a first component (1) having a female part and a second component (21) having a male part, wherein the female part comprises an axial bore (3) having a first diameter and containing a tie (4), one end of the tie being equipped with an opening (6a) designed to constitute a female element of a bayonet-type fitting and the tie further comprises a transverse passage (5) with a spindle (9) passing through the transverse passage and being equipped with two journals (10, 11) housed in two transverse holes (7, 8) in the first component (1) and including between the two journals (10, 11) and in a portion to be found inside the transverse passage (5) of the tie (4), a cam (12) having a transverse section having at least two opposed wall parts (P, X), wherein a distance between the two opposed wall parts being less than a distance between two axially opposed walls of the transverse passage (5) of the tie (4), wherein the male part of the second component (21) comprises an end (24) designed to constitute a male element of the bayonet-type fitting which, in collaboration with the female element (6) of the tie (4), axially fastens the two components (1, 21), and said second component further comprises a journal (23) having a second diameter substantially the same as the first diameter of the axial bore (3), wherein said spindle (9) is equipped with means (15) to be turned in order to obtain clamping and release of the two components (1, 21) through the action of the cam (12) on the two axially opposed walls of the transverse passage (5) of the tie (4).

2. The assembly as claimed in claim 1, wherein the male part of the second component (21), comprises, close to its lateral surface, tenons (27) intended to collaborate with matching notches (18) situated on a lateral surface of the female part of the first component (1) in order to transmit torsional loads between the two components (1, 21).

3. The assembly as claimed in claim 1, wherein the male part is equipped with a male preguiding element (25) collaborating with a hole (26) in the tie (4) in order to center the two components (1, 21) before the journal (23) of the second component (21) engages in the axial bore (3) of the first component.

4. The assembly as claimed in claim 1 wherein the cam (12) of said spindle (9) has an axis of pivoting (A) has a profile which is asymmetric relative to an axial plane so as to allow clamping in just one direction of rotation of said spindle (9), wherein said profile of the cam (12) has a surface for bearing on the walls of the transverse passage (5) of the tie (4) having a section (S1) with a rapidly progressive slope making it possible for the two components (1, 21) to approach each other rapidly after the male elements (24) of the bayonet-type fitting has engaged in the corresponding female element (6), followed by a section (X) with a slow constant variation in slope in order to provide the high clamping force between the components (1, 21) followed by a Short arc of a circle (S2) concentric with the axis of pivoting (A) and a section (S3) with a rapidly varying degressive slope ending in a flat (P) making it possible to keep the assembly open at rest.

5. The assembly as claimed in claim 1, wherein the tie (4) is subjected to an axial return force pushing the tie against the cam (12) toward the second component (21).

6. The assembly as claimed in claim 5, wherein the return force is generated by a spring (16) located in a housing at the bottom of the axial bore (3) in the first component (1).

* * * * *